(12) United States Patent
Sankarram et al.

(10) Patent No.: US 10,735,210 B2
(45) Date of Patent: Aug. 4, 2020

(54) DYNAMIC BINDING FOR SOFTWARE COMPONENTS

(71) Applicant: SAP SE, Walldorf (DE)

(72) Inventors: Chandrasekar Sankarram, San Jose, CA (US); Yukching Leung, Palo Alto, CA (US)

(73) Assignee: SAP SE, Walldorf (DE)

( * ) Notice: Subject to any disclaimer, the term of this patent is extended or adjusted under 35 U.S.C. 154(b) by 474 days.

(21) Appl. No.: 15/588,543

(22) Filed: May 5, 2017

(65) Prior Publication Data

US 2018/0323983 A1 Nov. 8, 2018

(51) Int. Cl.
*H04L 12/18* (2006.01)
*H04L 29/08* (2006.01)
*H04L 29/06* (2006.01)

(52) U.S. Cl.
CPC .......... *H04L 12/18* (2013.01); *H04L 12/1859* (2013.01); *H04L 67/104* (2013.01); *H04L 67/141* (2013.01); *H04L 67/16* (2013.01); *H04L 69/14* (2013.01)

(58) Field of Classification Search
CPC ...................................................... H04L 12/18
See application file for complete search history.

(56) References Cited

U.S. PATENT DOCUMENTS

| | | | | |
|---|---|---|---|---|
| 2015/0365457 A1* | 12/2015 | Dvir | ...................... | H04L 65/608 709/219 |
| 2016/0117207 A1* | 4/2016 | Bellessort | ............... | G06F 9/547 719/328 |
| 2017/0245120 A1* | 8/2017 | Huang | .................... | H04W 4/06 |

* cited by examiner

*Primary Examiner* — Nicholas P Celani
(74) *Attorney, Agent, or Firm* — Fountainhead Law Group P.C.

(57) ABSTRACT

Some embodiments provide a non-transitory machine-readable medium that stores a program. The program transmits via a multicast communication protocol a message specifying a set of services offered by the device to a plurality of computing devices. The program further establishes a connection with a computing device in the plurality of computing devices. The program also receives, through the connection, a set of data for the set of services. The program further applies the set of services to the set of data.

12 Claims, 11 Drawing Sheets

DYNAMIC BINDING FOR SOFTWARE COMPONENTS

BACKGROUND

Software operating on computing systems can be implementing by a multitude of components that provide any number of different services and/or functionalities. Such components may utilize services and/or functionalities of other components and/or provide services and/or functionalities to other components. For example, a component that is configured to gather data may provide the gathered data to another component configured to perform some operations on the gathered data (e.g., clean the data, filter the data, manipulate the data, etc.). In such an example, the components are often hard-coded to communicate and interact with each other. That is, the components are bound to each other in a static fashion.

SUMMARY

In some embodiments, a non-transitory machine-readable medium stores a program. The program transmits via a multicast communication protocol a message specifying a set of services offered by the device to a plurality of computing devices. The program further establishes a connection with a computing device in the plurality of computing devices. The program also receives, through the connection, a set of data for the set of services. The program further applies the set of services to the set of data.

In some embodiments, the set of data may be a first set of data. Applying the set of services to the first set of data may include generating a second set of data based on the first set of data. The message may be a first message, the connection may be a first connection, the computing device may be a first computing device, and the set of services may be a first set of services. The program may further receive via the multicast communication protocol a second message from a second computing device. The second message may specify a second set of services offered by the second computing device. The program may also establish a second connection to the second computing device. The program may further send the second set of data to the second computing device in order for the second computing device to apply the second set of services to the second set of data.

In some embodiments, the connection may be a first connection, the computing device may be a first computing device, and the set of data may be a first set of data. The program may further establish a second connection with a second computing device in the plurality of computing devices. The program may also receive, through the second connection, a second set of data for the set of services. The program may further apply the set of services to the second set of data. The message may further specify host information associated with the device. Establishing the connection may be initiated by the computing device in the plurality of computing devices based on the host information. The program may further periodically transmit via the multicast communication protocol the message to the plurality of computing devices. The connection may be a peer-to-peer connection.

For a device, method transmit via a multicast communication protocol a message specifying a set of services offered by the device to a plurality of computing devices. The method further establishes a connection with a computing device in the plurality of computing devices. The program also receives, through the connection, a set of data for the set of services. The method further applies the set of services to the set of data.

In some embodiments, the set of data may be a first set of data. Applying the set of services to the first set of data may include generating a second set of data based on the first set of data. The message may be a first message, the connection may be a first connection, the computing device may be a first computing device, and the set of services may be a first set of services. The method may further receive via the multicast communication protocol a second message from a second computing device. The second message may specify a second set of services offered by the second computing device. The method may also establish a second connection to the second computing device. The method may further send the second set of data to the second computing device in order for the second computing device to apply the second set of services to the second set of data.

In some embodiments, the connection may be a first connection, the computing device may be a first computing device, and the set of data may be a first set of data. The method may further establish a second connection with a second computing device in the plurality of computing devices. The method may also receive, through the second connection, a second set of data for the set of services. The method may further apply the set of services to the second set of data. The message may further specify host information associated with the device. Establishing the connection may be initiated by the computing device in the plurality of computing devices based on the host information. The method may further periodically transmit via the multicast communication protocol the message to the plurality of computing devices. The connection may be a peer-to-peer connection.

In some embodiments, a system includes a set of processing units and a non-transitory computer-readable medium that stores instructions. The instructions cause at least one processing unit to transmit via a multicast communication protocol a message specifying a set of services offered by the device to a plurality of computing devices. The instructions further cause the at least one processing unit to establish a connection with a computing device in the plurality of computing devices. The instructions also cause the at least one processing unit to receive, through the connection, a set of data for the set of services. The instructions further cause the at least one processing unit to apply the set of services to the set of data.

In some embodiments, the set of data may be a first set of data. Applying the set of services to the first set of data may include generating a second set of data based on the first set of data. The message may be a first message, the connection may be a first connection, the computing device may be a first computing device, and the set of services may be a first set of services. The instructions may further cause the at least one processing unit to receive via the multicast communication protocol a second message from a second computing device, the second message specifying a second set of services offered by the second computing device. The instructions may also cause the at least one processing unit to establish a second connection to the second computing device. The instructions may further cause the at least one processing unit to send the second set of data to the second computing device in order for the second computing device to apply the second set of services to the second set of data.

In some embodiments, the connection may be a first connection, the computing device may be a first computing device, and the set of data may be a first set of data. The instructions may further cause the at least one processing unit to establish a second connection with a second computing device in the plurality of computing devices. The instructions may also cause the at least one processing unit to receive, through the second connection, a second set of data for the set of services. The instructions may further cause the at least one processing unit to apply the set of services to the second set of data. The message may further specify host information associated with the system. Establishing the connection may be initiated by the computing device in the plurality of computing devices based on the host information. The instructions may further cause the at least one processing unit to periodically transmit via the multicast communication protocol the message to the plurality of computing devices.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for dynamically binding software components operating in a computing environment. In some embodiments, software components utilize a multicast communication protocol to communicate with each other. Via the multicast communication protocol, software components (also referred to as publisher components) configured to provide services and/or functionalities may announce their services and/or functionalities and identification information to other software components. Software components (also referred to as subscriber components) that would like to use services and/or functionalities provided by publisher components may do so by initiating communication with publisher components based on the identification information of the publisher components.

Figure 1:
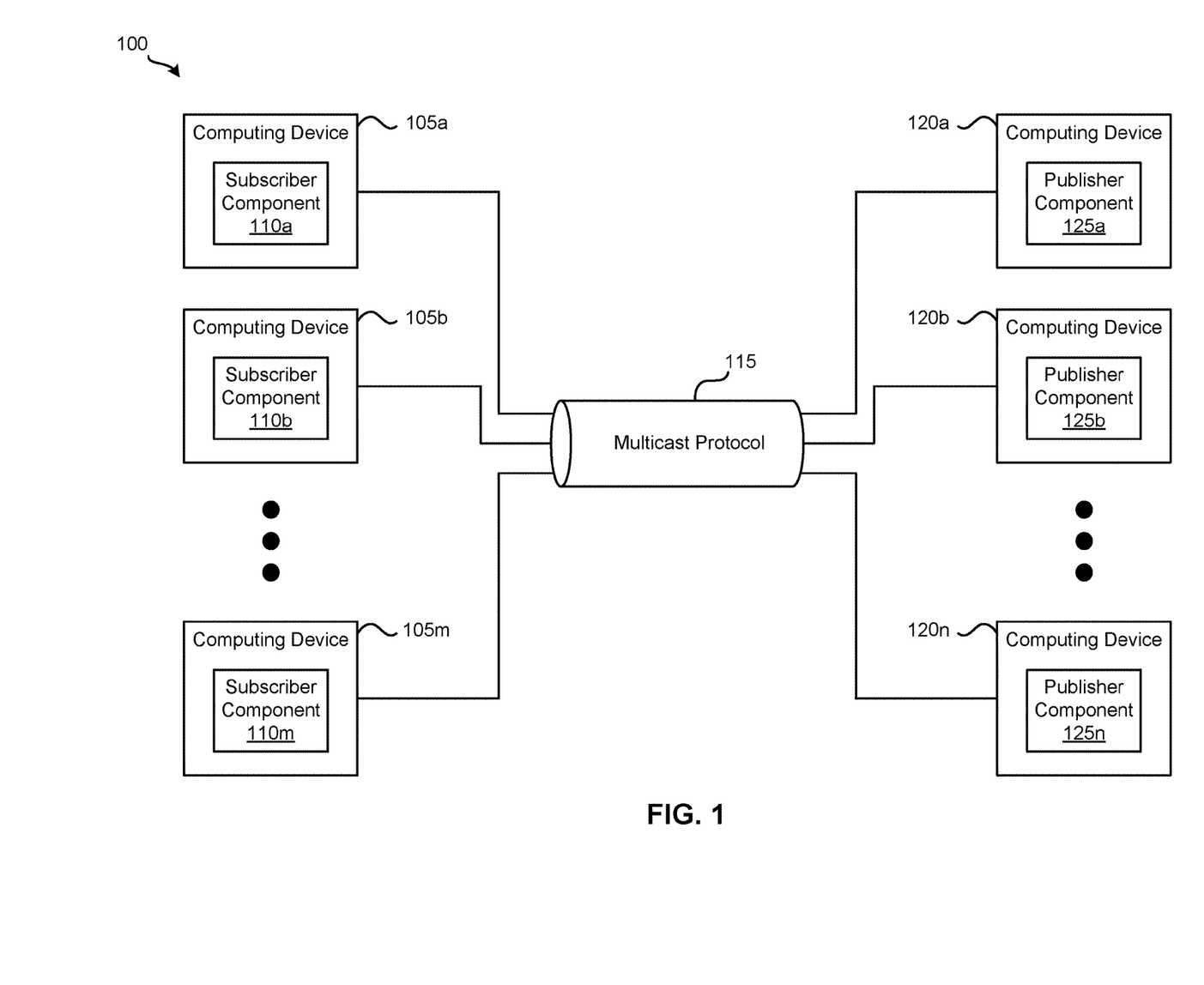
FIG. 1 illustrates a system that provides dynamic binding of components according to some embodiments.

FIG. 1 illustrates a system 100 that provides dynamic binding of components according to some embodiments. As shown, system 100 includes computing devices 105a-m and computing devices 120a-n. In some embodiments, computing devices 105a-m and computing devices 120a-n are implemented in a distributed processing environment (e.g., a cloud computing system). Computing devices 105a-m and computing devices 120a-n are communicatively coupled via multicast protocol 115. In some embodiments, multicast protocol 115 may be implemented using a communication protocol that allows one-to-many and/or many-to-many communication. For instance, multicast protocol 115 may be an Internet Protocol (IP) multicast protocol such as an Internet Group Management Protocol (IGMP) communication protocol used on IP version 4 (IPv4) networks or a multicast listener discovery (MLD) communication protocol used on IP version 6 (IPv6) networks. In some such instances, the IP multicast protocol employs a range of multicast addresses from 224.0.0.0 to 239.255.255.255 for transmitting multicast communications. For example, multicast IP address 230.1.1.1 may be used for communicating multicast data. In such an example, computing devices 105a-m may be configured to receive data transmitted to multicast IP address 230.1.1.1 and computing devices 120a-n may be configured to transmit multicast data to multicast IP address 230.1.1.1. As such, any data transmitted from a computing device 120 to IP address 230.1.1.1 is distributed to computing devices 105a-m.

As illustrated in FIG. 1, each of the computing devices 105a-m includes a subscriber component 110. In some embodiments, subscriber components 110a-m are software components operating on their respective computing devices 105a-m that are configured to receive multicast communications transmitted from publisher components 125a-n via multicast protocol 115. Subscriber components 110a-m may utilize services and/or functionalities offered by publisher components 125a-n. If a subscriber component 110 is using services and/or functionalities offered by a publisher component 125 and the publisher component 125 fails, the subscriber component 110 may use another publisher component 125 offering the same or similar services and/or functionalities. In some embodiments, a subscriber component 110 may simultaneously use services and/or functionalities offered by different publisher components.

Each of the computing devices 120a-n includes a publisher component 125. In some embodiments, publisher components 125a-n are software components operating on their respective computing devices 120a-n that are configured to transmit multicast communications transmitted to subscriber components 110a-m via multicast protocol 115. Publisher components 125a-n may offer and provide services and/or functionalities to subscriber components 110a-m. In some embodiments, a publisher component 125 may be configured to provide services and/or functionalities to a defined number of subscriber components (e.g., five subscriber components, ten subscriber components, twenty-five subscriber components, etc.). If a publisher component 125 is providing services and/or functionalities to a number of subscriber components less than the defined number of subscriber components, the publisher component 125 may periodically transmit messages, via multicast protocol 115, specifying, among other information, the services and/or functionalities offered by the publisher component 125. Once a publisher component 125 is providing services and/or functionalities to a number of subscriber components equal to the defined number of subscriber components, the publisher component 125 may stop transmitting messages specifying the services and/or functionalities offered by the publisher component 125.

Figure 2A:
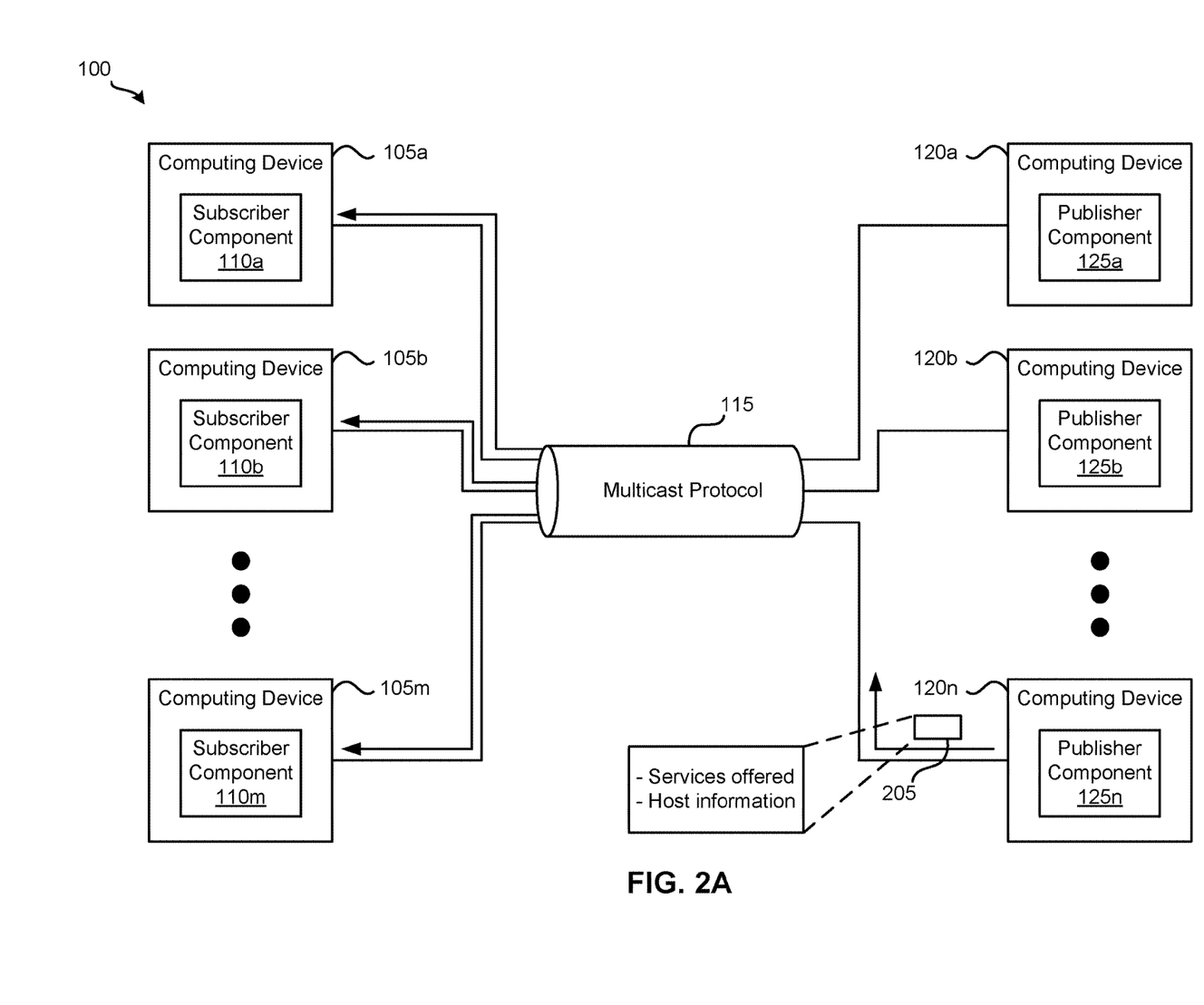
FIGS. 2A and 2B illustrate a dynamic component binding dataflow through the system illustrated in FIG. 1 according to some embodiments.
Figure 2B:
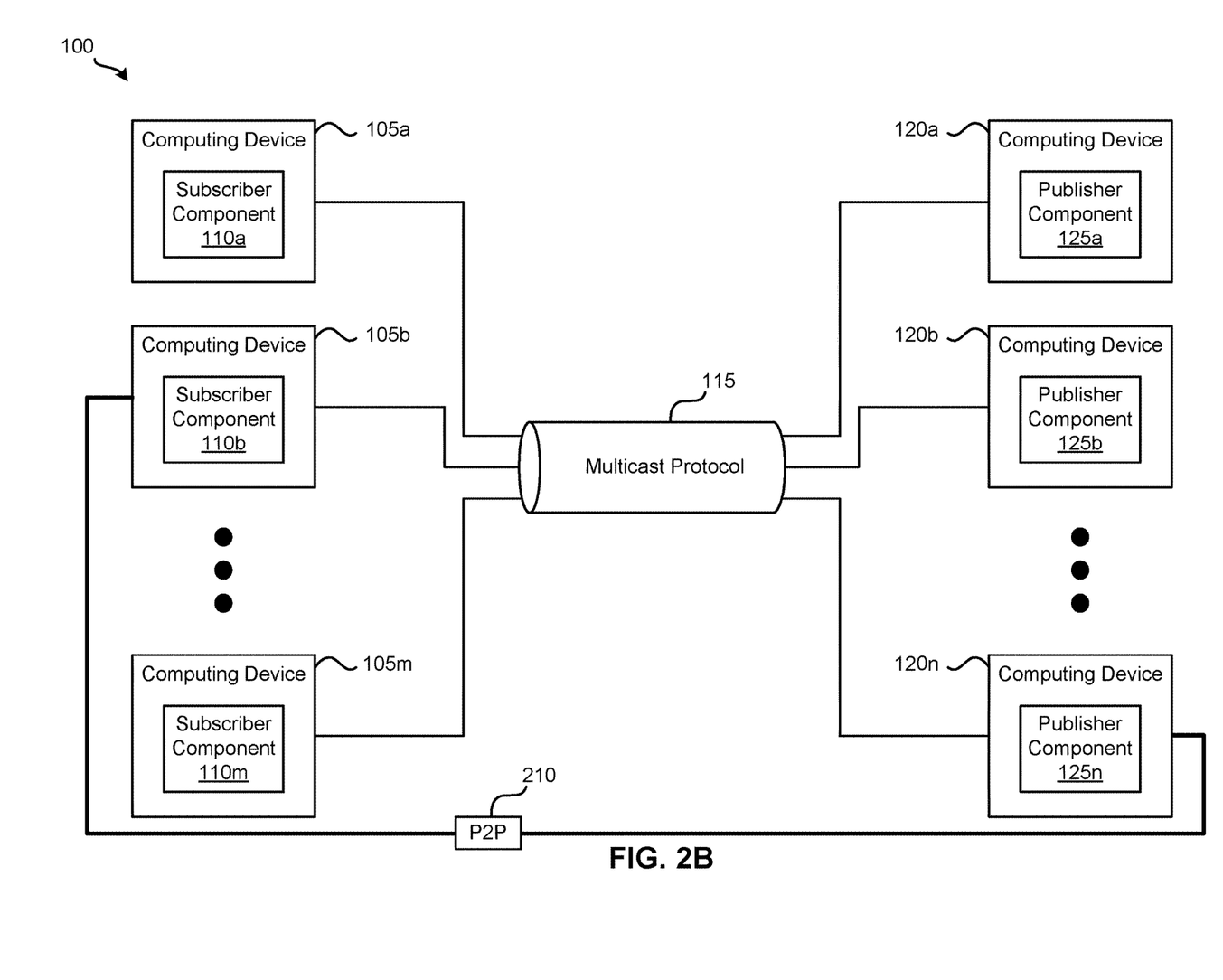

FIGS. 2A and 2B illustrate a dynamic component binding dataflow through the system illustrated in FIG. 1 according to some embodiments. Specifically, FIGS. 2A and 2B illustrate an example of a subscriber component binding with a publisher component. As shown in FIG. 2A, publisher component 125n operating on computing device 120n is sending message 205 to subscriber components 110a-m via multicast protocol 115. Message 205 in this example specifies a set of services offered by publisher component 125n and host information associated with computing device 120n. Example of services that may be offered by a publisher component 125 include data processing, data filtering, data sorting, data classification, data analysis, data collecting, data distribution, data verification, data cleansing, data extraction, etc. In some embodiments, a publisher component 125 may offer services for certain types of data (e.g., audio data, video data, image data, login data, log file data, etc.), certain size data, certain timeframe data (e.g., data associated with a previous year, the most recent day, week, or month of data, etc.), data obtained from certain data sources, etc. The host information associated with computing device 120n may include an IP address associated with the computing device 120n and a port associated with the IP address through which the set of services are offered. In some embodiments, message 205 may specify additional and/or different information.

FIG. 2B illustrates a subscriber component binding with a publisher component in response to the message multicasted in FIG. 2A. In this example, upon receiving the multicasted message from publisher component 125n, subscriber component 110b initiated a binding to publisher component 125n by establishing a peer-to-peer (P2P) connection 210 with publisher component 125n. In some embodiments, P2P connection 210 may be implemented using a transmission control protocol (TCP) connection, a hypertext transfer protocol (HTTP) connection, a HTTP secure (HTTPS) connection, or any other type of connection that can implement a P2P connection. As shown in FIG. 2B, subscriber component 110b is bound to publisher component 125n via P2P connection 210. In some embodiments, a subscriber component is bound to a publisher component when the subscriber component and the publisher component are communicatively coupled to each other via a P2P connection and the subscriber component is utilizing services offered by the publisher component via the P2P connection. For instance, subscriber component 110b may be configured to collect image data from a particular set of data sources and publisher component 125n may be configured to process image data. In such a scenario, subscriber component 110b may send, via P2P connection 210, collected image data to publisher component 125n for processing.

Figure 3A:
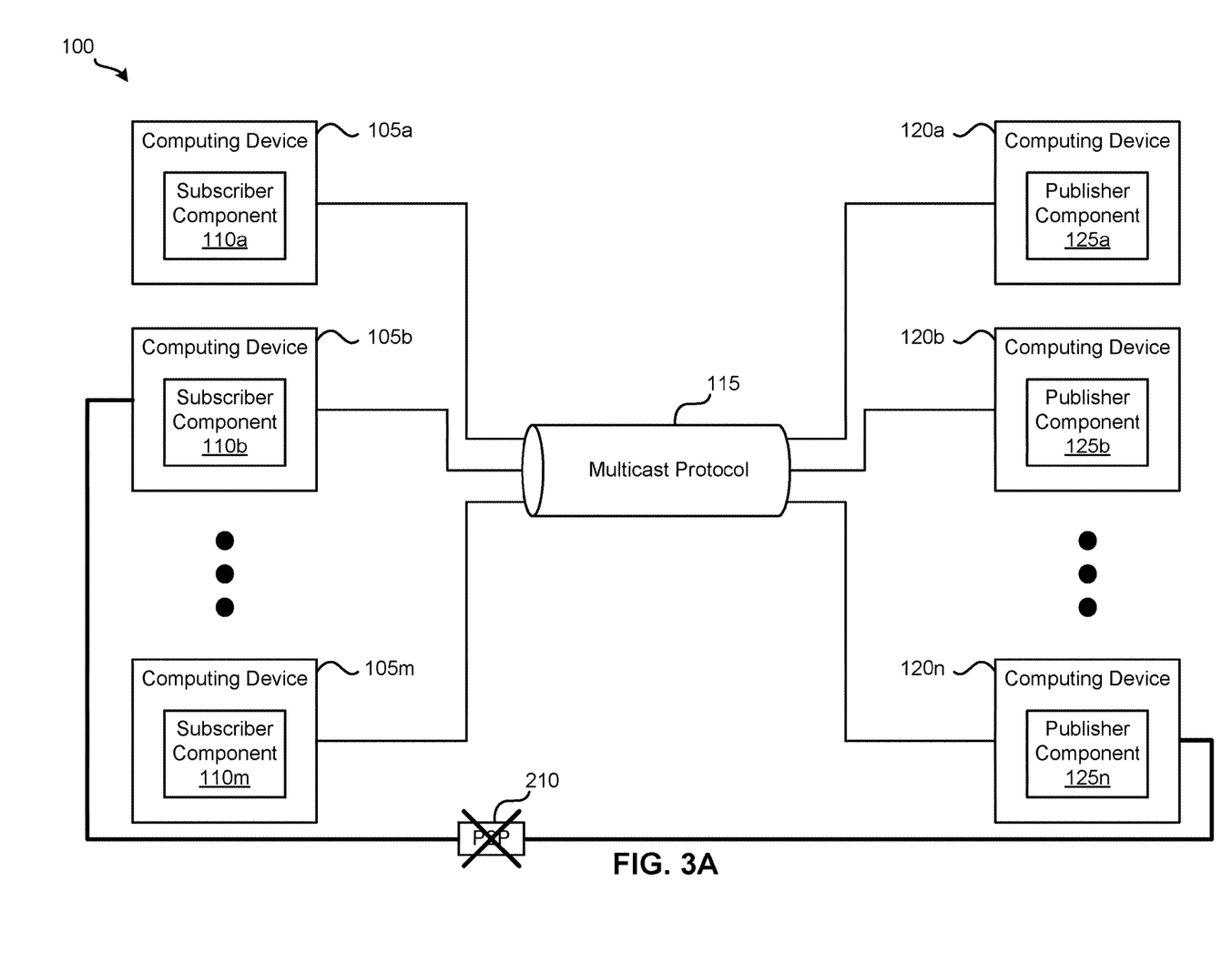
FIGS. 3A-3C illustrate another dynamic component binding dataflow through the system illustrated in FIG. 1 according to some embodiments.
Figure 3B:
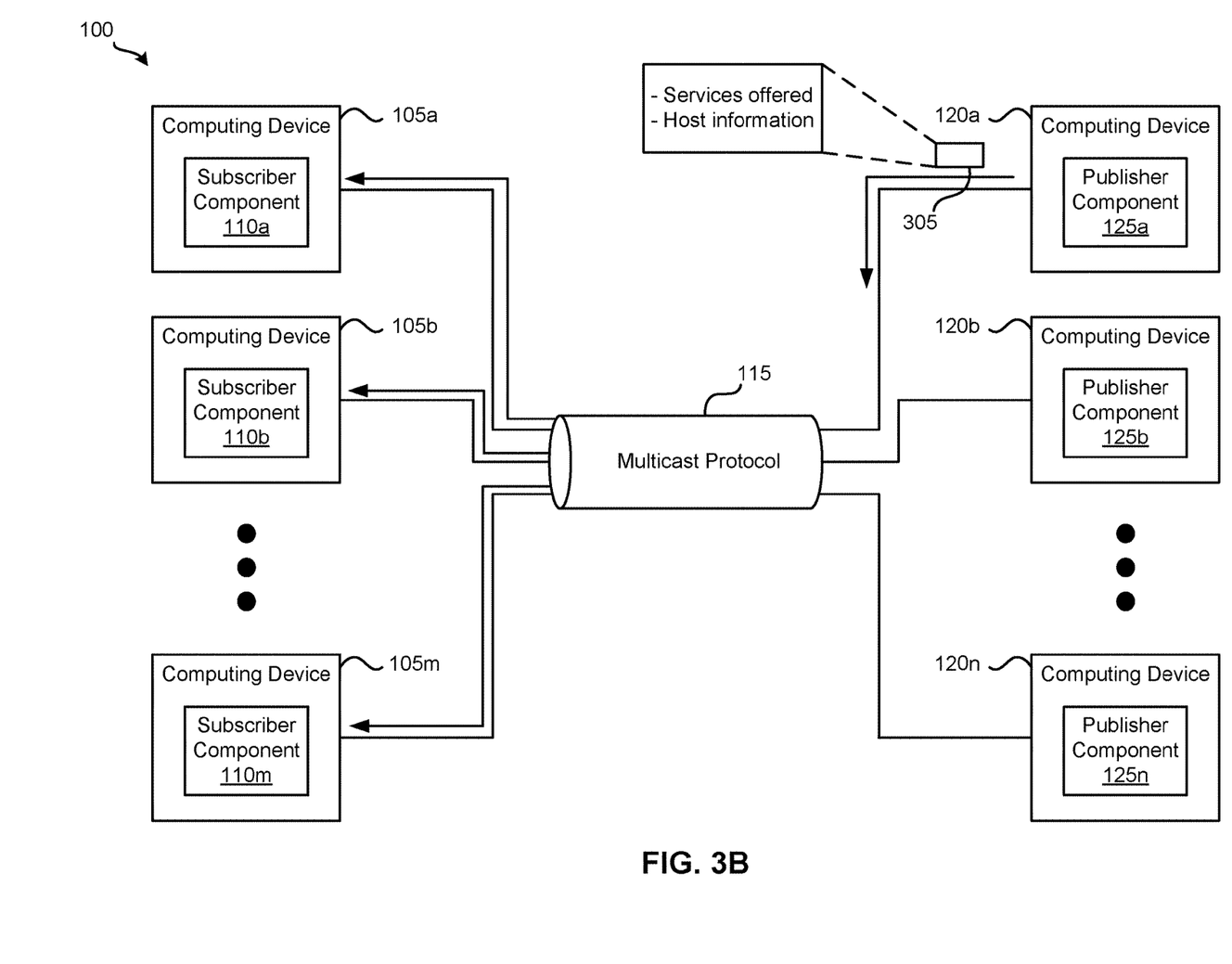
Figure 3C:
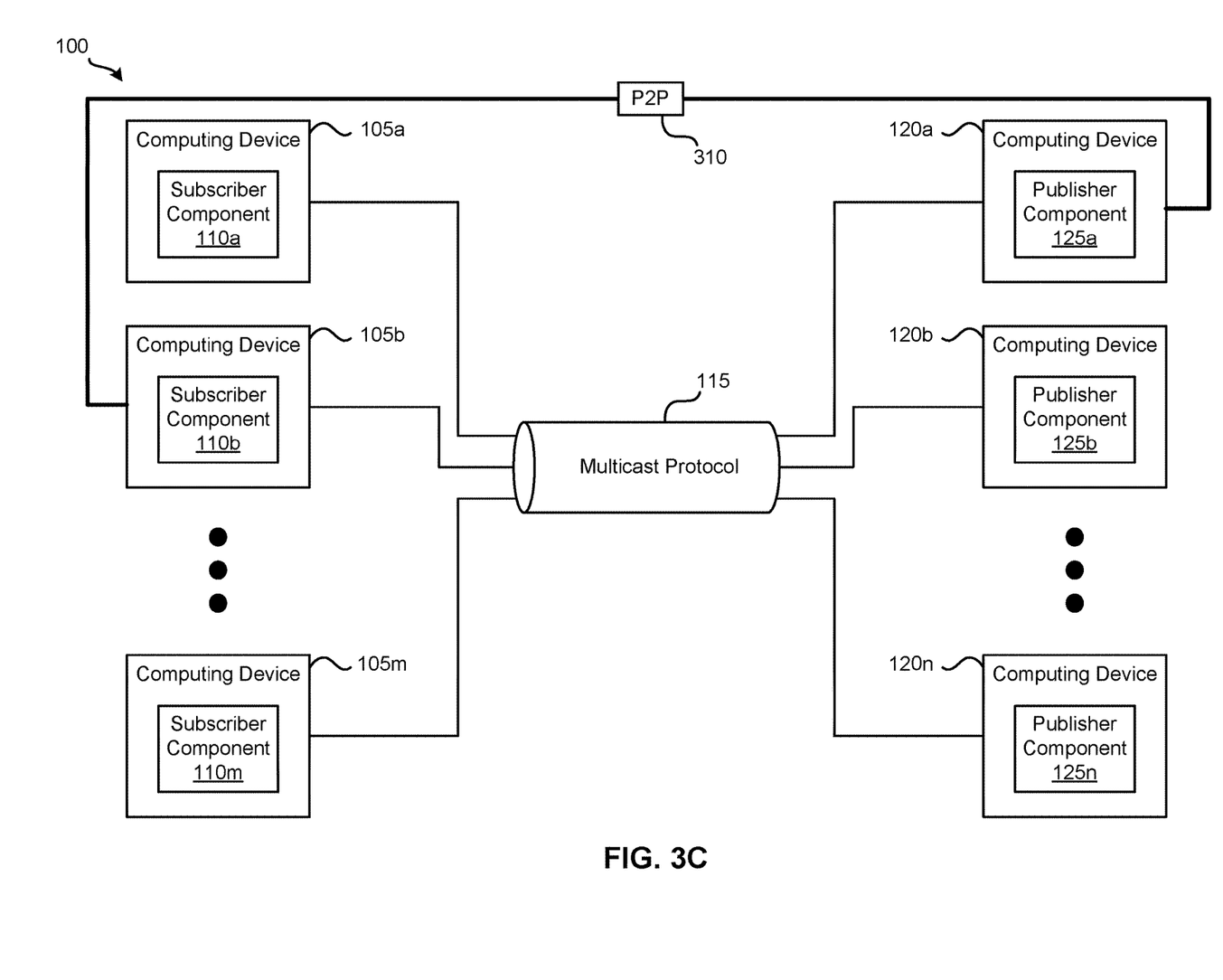

FIGS. 3A-3C illustrate another dynamic component binding dataflow through the system illustrated in FIG. 1 according to some embodiments. In particular, FIGS. 3A-3C illustrate an example of a subscriber component, which is bound to a first publisher component, binding to a second publisher component upon failure of the first publisher component.

FIG. 3A illustrates subscriber component 110b shown in FIG. 2B after subscriber component 110b detects a failure of publisher component 125n. (e.g., publisher component 125n is unresponsive, publisher component 125n too slow in responding, subscriber component 110b is unable to decipher messages from publisher component 125n, etc.). In response to detecting the failure, subscriber component 110b unbinds from publisher component 125b by disconnecting P2P connection 210 with publisher component 125n, as shown in FIG. 3A.

FIG. 3B illustrates a publisher component multicasting a message to subscriber components after subscriber component 110b unbinds from publisher component 125n. As illustrated, publisher component 125a is sending message 305 to subscriber components 110a-m via multicast protocol 115. Message 305 is similar to message 205. That is, message 305 specifies a set of services offered by publisher component 125a and host information associated with computing device 120a.

FIG. 3C illustrates a subscriber component binding with a publisher component in response to the message multicasted in FIG. 3B. For this example, the set of services offered by publisher component 125a includes the same set of services offered by publisher component 125n. Thus, upon receiving the multicasted message from publisher component 125a, subscriber component 110b initiated a binding to publisher component 125a by establishing P2P connection 310 with publisher component 125a. P2P connection 210 may be similar to P2P connection 210 in that P2P connection 310 may be implemented using a TCP connection, an HTTP connection, an HTTPS connection, or any other type of connection that can implement a P2P connection. As illustrated in FIG. 3C, subscriber component 110b is bound to publisher component 125a via P2P connection 310.

FIGS. 1-3 illustrate subscriber components and publisher components operating on separate computing devices. One of ordinary skill in the art will understand that several components may operate on the same computing device. For example, two or more subscriber components 110 may be operating on the same computing device, two or more publisher components may be operating on the same computing device, and/or two or more subscriber and publisher components may be operating on the same computing device.

Figure 4:
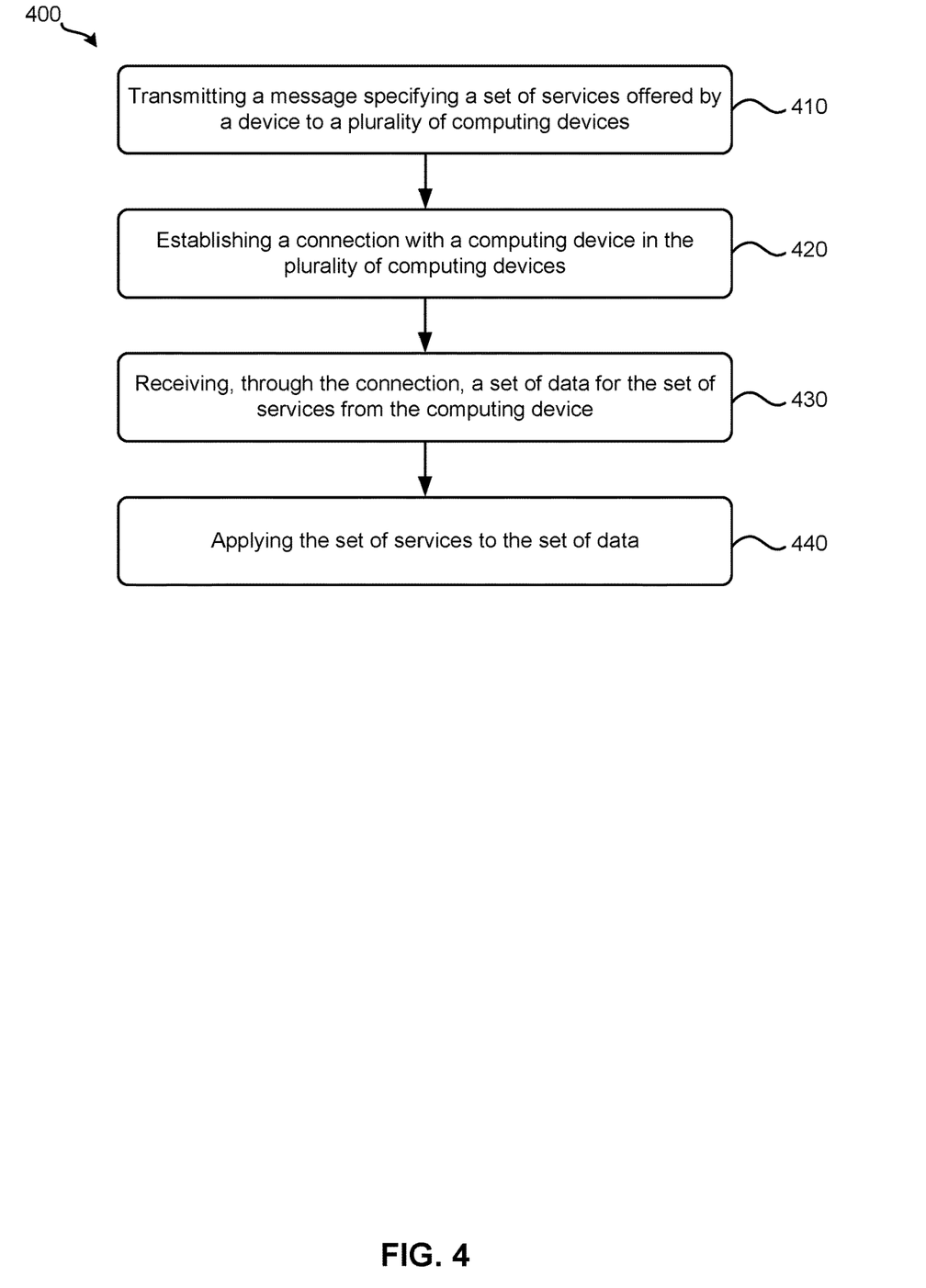
FIG. 4 illustrates a process for dynamically binding components according to some embodiments.

FIG. 4 illustrates a process 400 for dynamically binding components according to some embodiments. In some embodiments, a publisher component performs process 400. Process 400 starts by transmitting, at 410, a message specifying a set of services offered by a device to a plurality of computing devices. Referring to FIG. 2A as an example, publisher component 125n may transmit message 205 to subscriber components 110a-m operating on computing devices 105a-m. In some embodiments the message is transmitted via a multicast communication protocol (e.g., multicast protocol 115).

Next, process 400 establishes, at 420, a connection with a computing device in the plurality of computing devices. In some embodiments, the connection established with the computing device is initiated by the computing device. Referring to FIG. 2B as an example, publisher component 125n may receive a request from subscriber component 110b to establish a connection with publisher component 125n.

Process 400 then receives, at 430, through the connection, a set of data for the set of services from the computing device. Referring to FIG. 2 as an example, publisher component 125n may offer a set of services that include processing image data and subscriber component 110b may be configured to collect image data from a particular set of data sources. In such an example, publisher component 125b may receive image data from subscriber component 110 via P2P connection 210 that subscriber component 110b collected from the particular set of data sources. Finally, process 400 applies, at 440, the set of services to the set of data.

Continuing with the above example, publisher component 125*b* may process the image data received from subscriber component 110*b*.

Figure 5:
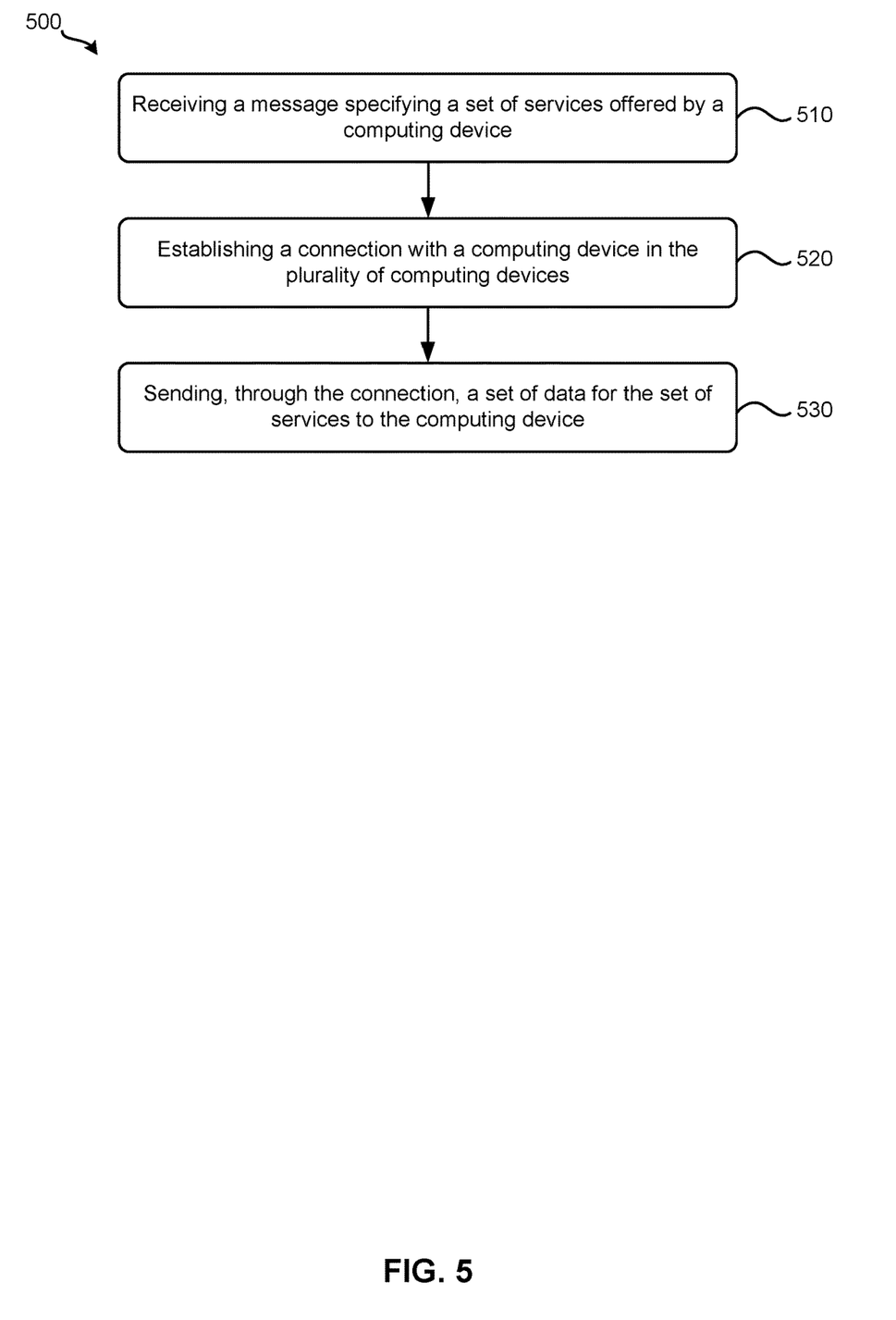
FIG. 5 illustrates another process for dynamically binding components according to some embodiments.

FIG. 5 illustrates a process 500 for dynamically binding components according to some embodiments. In some embodiments, a subscriber component performs process 500. Process 500 begins by receiving, at 510, a message specifying a set of services offered by a computing device. Referring to FIG. 2A as an example, a subscriber component 110 operating on a computing device 105 may receive message 205 from publisher component 125*n*. In some embodiments the message is transmitted via a multicast communication protocol (e.g., multicast protocol 115).

Next, process 500 establishes, at 520, a connection with the computing device. In some embodiments, process 500 establishes the connection with the computing device by sending a request to the computing device to establish the connection. Referring to FIG. 2B as an example, subscriber component 110*b* may send publisher component 125*n* a request to establish a connection with publisher component 125*n*.

Process 500 then sends, at 530, through the connection, a set of data for the set of services to the computing device. Referring to FIG. 2 as an example, publisher component 125*n* may offer a set of services that include processing image data and subscriber component 110*b* may be configured to collect image data from a particular set of data sources. In such an example, subscriber component 110 may send image data to publisher component 125*b* via P2P connection 210 that subscriber component 110*b* collected from the particular set of data sources.

Figure 6:
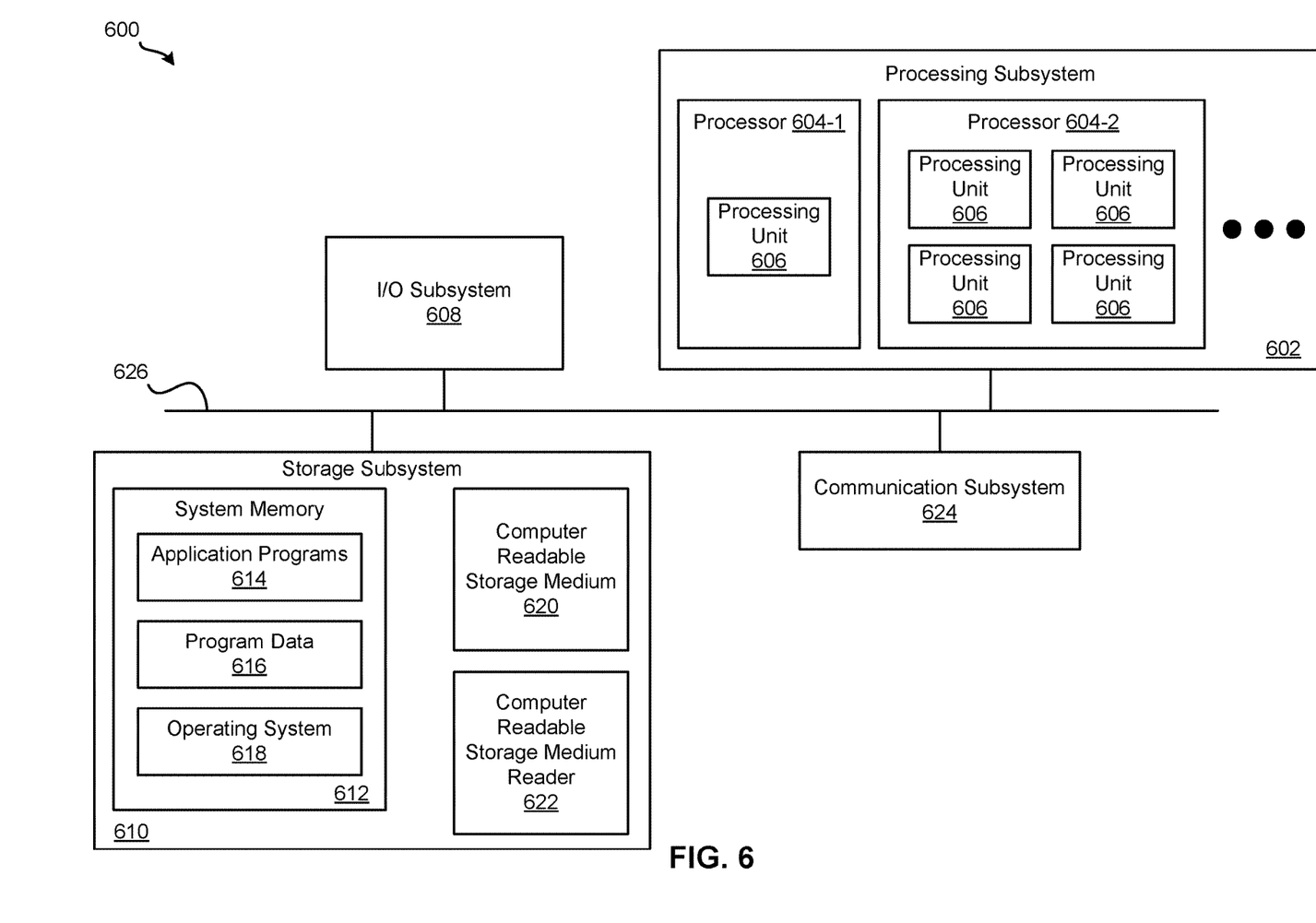
FIG. 6 illustrates an exemplary computer system, in which various embodiments may be implemented.

FIG. 6 illustrates an exemplary computer system 600 for implementing various embodiments described above. For example, computer system 600 may be used to implement computing devices 105*a-m* and computing devices 120*a-n*. Computer system 600 may be a desktop computer, a laptop, a server computer, or any other type of computer system or combination thereof. Computer system 600 can implement many of the operations, methods, and/or processes described above (e.g., process 400 and process 500). As shown in FIG. 6, computer system 600 includes processing subsystem 602, which communicates, via bus subsystem 626, with input/output (I/O) subsystem 608, storage subsystem 610 and communication subsystem 624.

Bus subsystem 626 is configured to facilitate communication among the various components and subsystems of computer system 600. While bus subsystem 626 is illustrated in FIG. 6 as a single bus, one of ordinary skill in the art will understand that bus subsystem 626 may be implemented as multiple buses. Bus subsystem 626 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 602, which can be implemented as one or more integrated circuits (e.g., a conventional microprocessor or microcontroller), controls the operation of computer system 600. Processing subsystem 602 may include one or more processors 604. Each processor 604 may include one processing unit 606 (e.g., a single core processor such as processor 604-1) or several processing units 606 (e.g., a multicore processor such as processor 604-2). In some embodiments, processors 604 of processing subsystem 602 may be implemented as independent processors while, in other embodiments, processors 604 of processing subsystem 602 may be implemented as multiple processors integrate into a single chip or multiple chips. Still, in some embodiments, processors 604 of processing subsystem 602 may be implemented as a combination of independent processors and multiple processors integrated into a single chip or multiple chips.

In some embodiments, processing subsystem 602 can execute a variety of programs or processes in response to program code and can maintain multiple concurrently executing programs or processes. At any given time, some or all of the program code to be executed can reside in processing subsystem 602 and/or in storage subsystem 610. Through suitable programming, processing subsystem 602 can provide various functionalities, such as the functionalities described above by reference to process 400, process 500, etc.

I/O subsystem 608 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 600 to a user or another device (e.g., a printer).

As illustrated in FIG. 6, storage subsystem 610 includes system memory 612, computer-readable storage medium 620, and computer-readable storage medium reader 622. System memory 612 may be configured to store software in the form of program instructions that are loadable and executable by processing subsystem 602 as well as data generated during the execution of program instructions. In some embodiments, system memory 612 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 612 may include different types of memory, such as static random access memory (SRAM) and/or dynamic random access memory (DRAM). System memory 612 may include a basic input/output system (BIOS), in some embodiments, that is configured to store basic routines to facilitate transferring information between elements within computer system 600 (e.g., during start-up). Such a BIOS may be stored in ROM (e.g., a ROM chip), flash memory, or any other type of memory that may be configured to store the BIOS.

As shown in FIG. 6, system memory 612 includes application programs 614, program data 616, and operating system (OS) 618. OS 618 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 620 may be a non-transitory computer-readable medium configured to store software (e.g., programs, code modules, data constructs, instructions, etc.). Many of the components (e.g., subscriber components 110a-m and publisher components 125a-n) and/or processes (e.g., process 400 and process 500) described above may be implemented as software that when executed by a processor or processing unit (e.g., a processor or processing unit of processing subsystem 602) performs the operations of such components and/or processes. Storage subsystem 610 may also store data used for, or generated during, the execution of the software.

Storage subsystem 610 may also include computer-readable storage medium reader 622 that is configured to communicate with computer-readable storage medium 620. Together and, optionally, in combination with system memory 612, computer-readable storage medium 620 may comprehensively represent remote, local, fixed, and/or removable storage devices plus storage media for temporarily and/or more permanently containing, storing, transmitting, and retrieving computer-readable information.

Computer-readable storage medium 620 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 624 serves as an interface for receiving data from, and transmitting data to, other devices, computer systems, and networks. For example, communication subsystem 624 may allow computer system 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 624 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 624 may provide components configured for wired communication (e.g., Ethernet) in addition to or instead of components configured for wireless communication.

One of ordinary skill in the art will realize that the architecture shown in FIG. 6 is only an example architecture of computer system 600, and that computer system 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
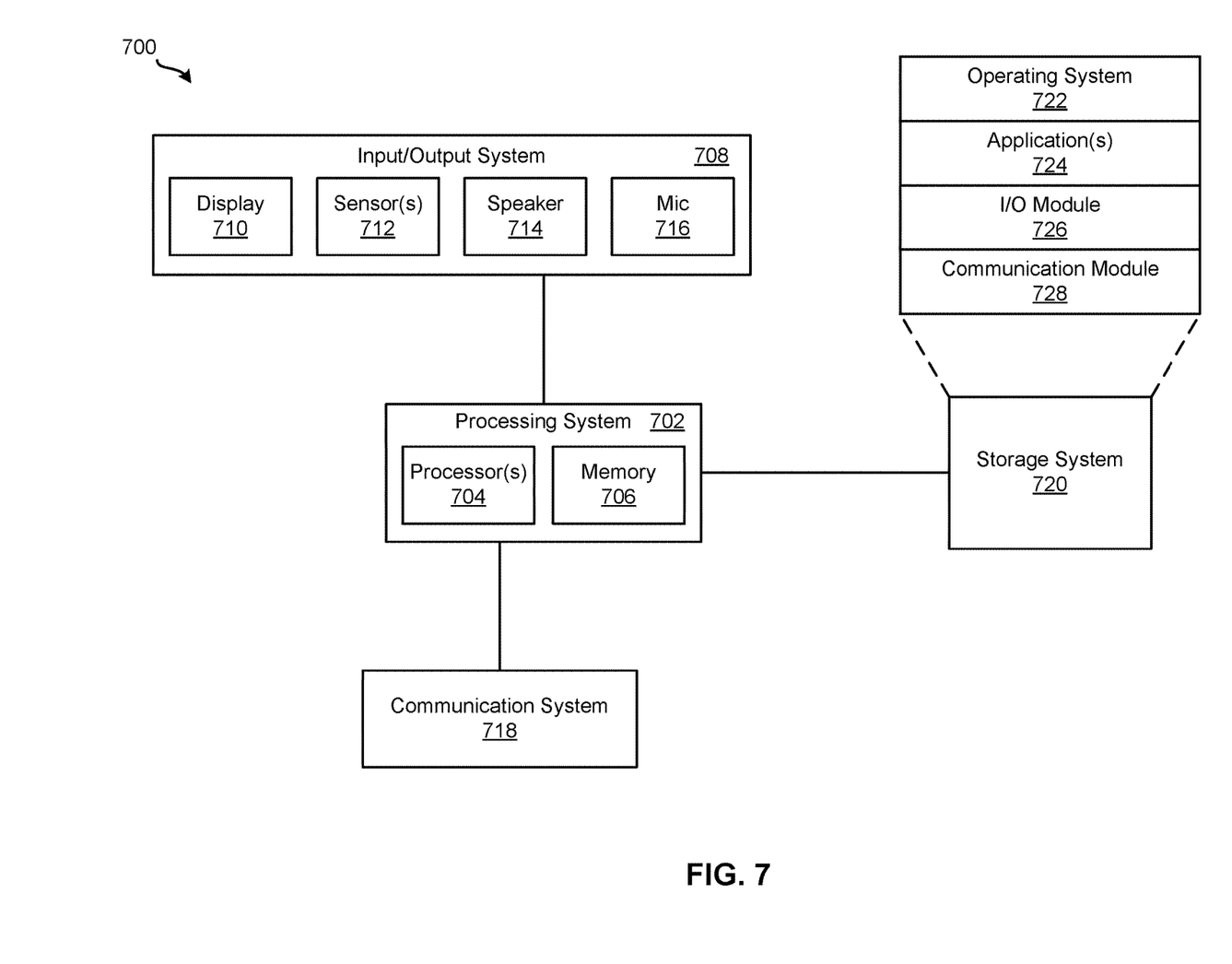
FIG. 7 illustrates an exemplary computing device, in which various embodiments may be implemented.

FIG. 7 illustrates an exemplary computing device 700 for implementing various embodiments described above. For example, computing device 700 may be used to implement computing devices 105a-m and computing devices 120a-n. Computing device 700 may be a cellphone, a smartphone, a wearable device, an activity tracker or manager, a tablet, a personal digital assistant (PDA), a media player, or any other type of mobile computing device or combination thereof. Computing device 700 can implement many of the operations, methods, and/or processes described above (e.g., process 400 and process 500). As shown in FIG. 7, computing device 700 includes processing system 702, input/output (I/O) system 708, communication system 718, and storage system 720. These components may be coupled by one or more communication buses or signal lines.

Processing system 702, which can be implemented as one or more integrated circuits (e.g., a conventional microprocessor or microcontroller), controls the operation of computing device 700. As shown, processing system 702 includes one or more processors 704 and memory 706. Processors 704 are configured to run or execute various software and/or sets of instructions stored in memory 706 to perform various functions for computing device 700 and to process data.

Each processor of processors 704 may include one processing unit (e.g., a single core processor) or several processing units (e.g., a multicore processor). In some embodiments, processors 704 of processing system 702 may be implemented as independent processors while, in other embodiments, processors 704 of processing system 702 may be implemented as multiple processors integrate into a single chip. Still, in some embodiments, processors 704 of processing system 702 may be implemented as a combination of independent processors and multiple processors integrated into a single chip.

Memory 706 may be configured to receive and store software (e.g., operating system 722, applications 724, I/O module 726, communication module 728, etc. from storage system 720) in the form of program instructions that are loadable and executable by processors 704 as well as data generated during the execution of program instructions. In some embodiments, memory 706 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 708 is responsible for receiving input through various components and providing output through various components. As shown for this example, I/O system 708 includes display 710, one or more sensors 712, speaker 714, and microphone 716. Display 710 is configured to output visual information (e.g., a graphical user interface (GUI) generated and/or rendered by processors 704). In some embodiments, display 710 is a touch screen that is configured to also receive touch-based input. Display 710 may be implemented using liquid crystal display (LCD) technology, light-emitting diode (LED) technology, organic LED (OLED) technology, organic electro luminescence (OEL) technology, or any other type of display technologies. Sensors 712 may include any number of different types of sensors for measuring a physical quantity (e.g., temperature, force, pressure, acceleration, orientation, light, radiation, etc.). Speaker 714 is configured to output audio information and microphone 716 is configured to receive audio input. One of ordinary skill in the art will appreciate that I/O system 708 may include any number of additional, fewer, and/or different components. For instance, I/O system 708 may include a keypad or keyboard for receiving input, a port for transmitting data, receiving data and/or power, and/or communicating with another device or component, an image capture component for capturing photos and/or videos, etc.

Communication system 718 serves as an interface for receiving data from, and transmitting data to, other devices, computer systems, and networks. For example, communication system 718 may allow computing device 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 718 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 718 may provide components configured for wired communication (e.g., Ethernet) in addition to or instead of components configured for wireless communication.

Storage system 720 handles the storage and management of data for computing device 700. Storage system 720 may be implemented by one or more non-transitory machine-readable mediums that are configured to store software (e.g., programs, code modules, data constructs, instructions, etc.) and store data used for, or generated during, the execution of the software. Many of the components (e.g., subscriber components 70a-m and publisher components 125a-n) and/or processes (e.g., process 400 and process 500) described above may be implemented as software that when executed by a processor or processing unit (e.g., processors 704 of processing system 702) performs the operations of such components and/or processes.

In this example, storage system 720 includes operating system 722, one or more applications 724, I/O module 726, and communication module 728. Operating system 722 includes various procedures, sets of instructions, software components and/or drivers for controlling and managing general system tasks (e.g., memory management, storage device control, power management, etc.) and facilitates communication between various hardware and software components. Operating system 722 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 724 can include any number of different applications installed on computing device 700. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 726 manages information received via input components (e.g., display 710, sensors 712, and microphone 716) and information to be outputted via output components (e.g., display 710 and speaker 714). Communication module 728 facilitates communication with other devices via communication system 718 and includes various software components for handling data received from communication system 718.

One of ordinary skill in the art will realize that the architecture shown in FIG. 7 is only an example architecture of computing device 700, and that computing device 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
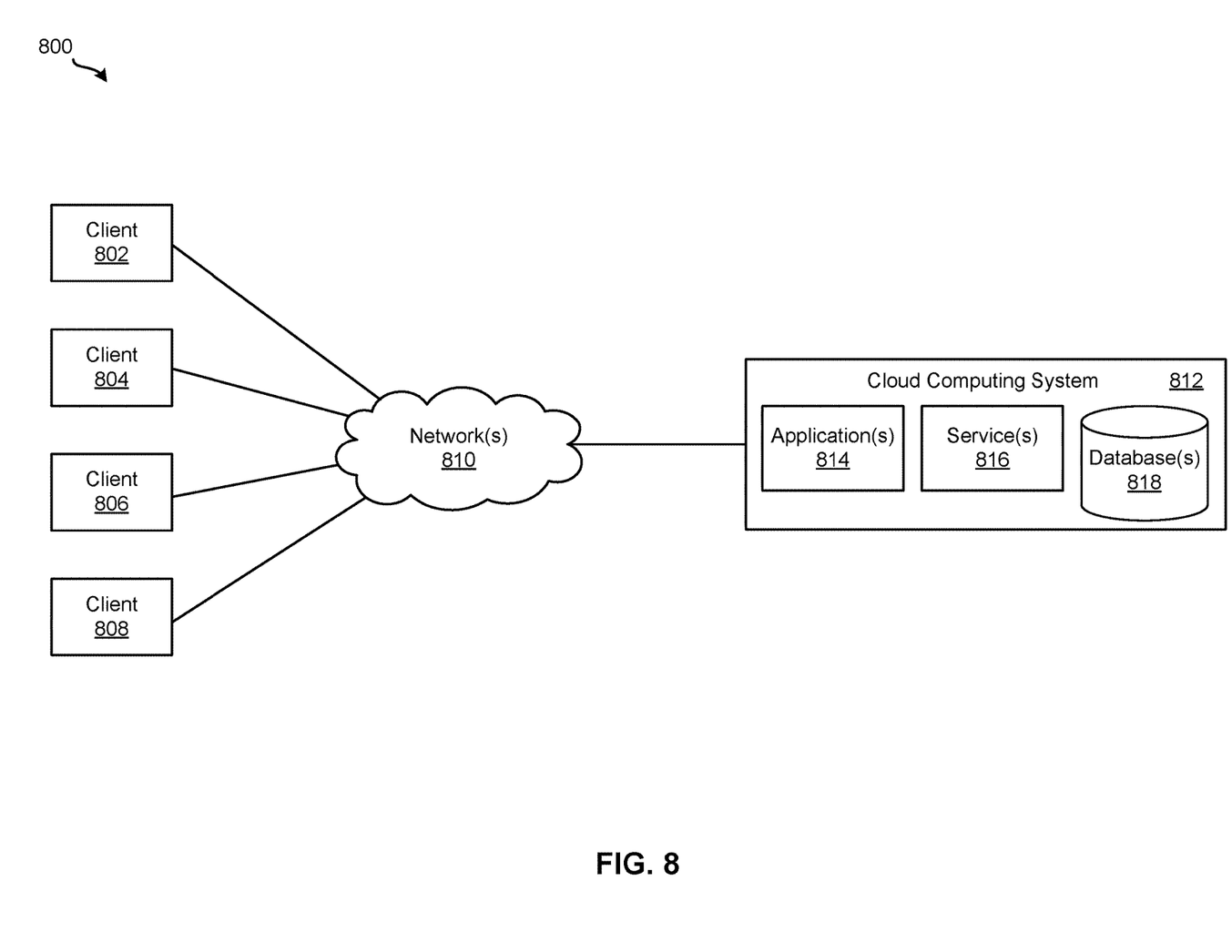
FIG. 8 illustrates system for implementing various embodiments described above.

FIG. 8 illustrates an exemplary system 800 for implementing various embodiments described above. For example, cloud computing system 812 of system 800 may be used to implement one or more computing devices 105a-m and computing devices 120a-n. As shown, system 800 includes client devices 802-808, one or more networks 810, and cloud computing system 812. Cloud computing system 812 is configured to provide resources and data to client devices 802-808 via networks 810. In some embodiments, cloud computing system 800 provides resources to any number of different users (e.g., customers, tenants, organizations, etc.). Cloud computing system 812 may be implemented by one or more computer systems (e.g., servers), virtual machines operating on a computer system, or a combination thereof.

As shown, cloud computing system 812 includes one or more applications 814, one or more services 816, and one or more databases 818. Cloud computing system 800 may provide applications 814, services 816, and databases 818 to any number of different customers in a self-service, subscription-based, elastically scalable, reliable, highly available, and secure manner.

In some embodiments, cloud computing system 800 may be adapted to automatically provision, manage, and track a customer's subscriptions to services offered by cloud computing system 800. Cloud computing system 800 may provide cloud services via different deployment models. For example, cloud services may be provided under a public cloud model in which cloud computing system 800 is owned by an organization selling cloud services and the cloud services are made available to the general public or different industry enterprises. As another example, cloud services may be provided under a private cloud model in which cloud computing system 800 is operated solely for a single organization and may provide cloud services for one or more entities within the organization. The cloud services may also be provided under a community cloud model in which cloud computing system 800 and the cloud services provided by cloud computing system 800 are shared by several organizations in a related community. The cloud services may also be provided under a hybrid cloud model, which is a combination of two or more of the aforementioned different models.

In some instances, any one of applications 814, services 816, and databases 818 made available to client devices 802-808 via networks 810 from cloud computing system 800 is referred to as a "cloud service." Typically, servers and systems that make up cloud computing system 800 are different from the on-premises servers and systems of a customer. For example, cloud computing system 800 may host an application and a user of one of client devices 802-808 may order and use the application via networks 810.

Applications 814 may include software applications that are configured to execute on cloud computing system 812 (e.g., a computer system or a virtual machine operating on a computer system) and be accessed, controlled, managed, etc. via client devices 802-808. In some embodiments, applications 814 may include server applications and/or mid-tier applications (e.g., HTTP (hypertext transport protocol) server applications, FTP (file transfer protocol) server applications, CGI (common gateway interface) server applications, JAVA server applications, etc.). Services 816 are software components, modules, application, etc. that are configured to execute on cloud computing system 812 and provide functionalities to client devices 802-808 via networks 810. Services 816 may be web-based services or on-demand cloud services.

Databases 818 are configured to store and/or manage data that is accessed by applications 814, services 816, and/or client devices 802-808. Databases 818 may reside on a non-transitory storage medium local to (and/or resident in) cloud computing system 812, in a storage-area network (SAN), on a non-transitory storage medium local located remotely from cloud computing system 812. In some embodiments, databases 818 may include relational databases that are managed by a relational database management system (RDBMS). Databases 818 may be a column-oriented databases, row-oriented databases, or a combination thereof. In some embodiments, some or all of databases 818 are in-memory databases. That is, in some such embodiments, data for databases 818 are stored and managed in memory (e.g., random access memory (RAM)).

Client devices 802-808 are configured to execute and operate a client application (e.g., a web browser, a proprietary client application, etc.) that communicates with applications 814, services 816, and/or databases 818 via networks 810. This way, client devices 802-808 may access the various functionalities provided by applications 814, services 816, and databases 818 while applications 814, services 816, and databases 818 are operating (e.g., hosted) on cloud computing system 800. Client devices 802-808 may be computer system 600 or computing device 700, as described above by reference to FIGS. 6 and 7, respectively. Although system 800 is shown with four client devices, any number of client devices may be supported.

Networks 810 may be any type of network configured to facilitate data communications among client devices 802-808 and cloud computing system 812 using any of a variety of network protocols. Networks 810 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:

periodically transmitting via a multicast communication protocol a message to a plurality of computing devices while a number of subscriber devices is less than a defined number, the message specifying a first set of services offered by the device, the device providing the first set of services to the subscriber devices;

establishing a first peer-to-peer connection with a first computing device in the plurality of computing devices for providing the first set of services, the establishing of the first peer-to-peer connection increasing the number of subscriber devices to the defined number, the periodic transmission of the message being stopped while the number of subscribed devices is equal to the defined number;

receiving, from the first computing device through the first peer-to-peer connection, a first set of data for the first set of services;

applying the first set of services to the first set of data, the applying of the first set of services to the first set of data including generating a second set of data based on the first set of data;

receiving via the multicast communication protocol a second message from a second computing device, the second message specifying a second set of services offered by the second computing device;

establishing a second peer-to-peer connection to the second computing device, and sending the second set of data to the second computing device in order for the second computing device to apply the second set of services to the second set of data;

detecting failure of the second computing device, wherein the detection of the failure of the second computing device includes determining that the second computer device is unresponsive, determining that the second computer device is slow in responding, or determining that messages from the second computer device are indecipherable; and unbinding from the second computer device by disconnecting the second peer-to-peer connection.

2. The non-transitory machine-readable medium of claim 1, wherein the program further comprises sets of instructions for:

establishing a third connection with a third computing device in the plurality of computing devices;

receiving, through the third connection, a third set of data for the first set of services; and applying the first set of services to the third set of data.

3. The non-transitory machine-readable medium of claim 1, wherein the message further specifies host information associated with the device, wherein the establishing of the first peer-to-peer connection is initiated by the computing device in the plurality of computing devices based on the host information.

4. For a device, a method comprising:
periodically transmitting via a multicast communication protocol a message to a plurality of computing devices while a number of subscriber devices is less than a defined number, the message specifying a first set of services offered by the device, the device providing the first set of services to the subscriber devices;
establishing a first peer-to-peer connection with a first computing device in the plurality of computing devices for providing the first set of services, the establishing of the first peer-to-peer connection increasing the number of subscriber devices to the defined number, the periodic transmission of the message being stopped while the number of subscribed devices is equal to the defined number;
receiving, from the first computing device through the first peer-to-peer connection, a first set of data for the first set of services;
applying the first set of services to the first set of data, the applying of the first set of services to the first set of data including generating a second set of data based on the first set of data;
receiving via the multicast communication protocol a second message from a second computing device, the second message specifying a second set of services offered by the second computing device;
establishing a second peer-to-peer connection to the second computing device, and
sending the second set of data to the second computing device in order for the second computing device to apply the second set of services to the second set of data;
detecting failure of the second computing device, wherein the detection of the failure of the second computing device includes determining that the second computer device is unresponsive, determining that the second computer device is slow in responding, or determining that messages from the second computer device are indecipherable; and
unbinding from the second computer device by disconnecting the second peer-to-peer connection.

5. The method of claim 4, wherein the method further comprises:
establishing a third connection with a third computing device in the plurality of computing devices;
receiving, through the third connection, a third set of data for the first set of services; and
applying the first set of services to the third set of data.

6. The method of claim 4, wherein the message further specifies host information associated with the device, wherein the establishing the first peer-to-peer connection is initiated by the first computing device in the plurality of computing devices based on the host information.

7. A system comprising:
a set of processing units; and
a non-transitory computer-readable medium storing instructions that when executed by at least one processing unit in the set of processing units cause the at least one processing unit to:
periodically transmit via a multicast communication protocol a message to a plurality of computing devices while a number of subscriber devices is less than a defined number, the message specifying a first set of services offered by the device, the device providing the first set of services to the subscriber devices;
establish a first peer-to-peer connection with a first computing device in the plurality of computing devices for providing the first set of services, the establishing of the first peer-to-peer connection increasing the number of subscriber devices to the defined number, the periodic transmission of the message being stopped while the number of subscribed devices is equal to the defined number;
receive, from the first computing device through the first peer-to-peer connection, a first set of data for the first set of services;
apply the first set of services to the first set of data, the applying of the first set of services to the first set of data including generating a second set of data based on the first set of data;
receive via the multicast communication protocol a second message from a second computing device, the second message specifying a second set of services offered by the second computing device;
establish a second peer-to-peer connection to the second computing device, and
send the second set of data to the second computing device in order for the second computing device to apply the second set of services to the second set of data;
detect failure of the second computing device, wherein the detection of the failure of the second computing device includes determining that the second computer device is unresponsive, determining that the second computer device is slow in responding, or determining that messages from the second computer device are indecipherable; and
unbind from the second computer device by disconnecting the second peer-to-peer connection.

8. The system of claim 7, wherein the instructions further cause the at least one processing unit to:
establish a third connection with a third computing device in the plurality of computing devices;
receive, through the third connection, a third set of data for the first set of services; and
apply the first set of services to the third set of data.

9. The system of claim 7, wherein the message further specifies host information associated with the system, wherein the establishing of the first peer-to-peer connection is initiated by the computing device in the plurality of computing devices based on the host information.

10. The non-transitory machine-readable medium of claim 1, wherein the first set of services includes services for processing image data, wherein the first set of data received through the first peer-to-peer connection includes image data collected by the first computing device, and wherein the applying of the first set of services to the first set of data includes processing the image data.

11. The non-transitory machine-readable medium of claim 1, wherein the first set of services is for processing certain timeframe data associated with a previous year or with a most recent day, week, or month of data.

12. The non-transitory machine-readable medium of claim 1, wherein the device and the first computing device are implemented in a distributed processing environment.

* * * * *